Feb. 3, 1970 V. R. HYDE 3,493,847
ON-LOAD TAP CHANGING CIRCUITS
Filed Dec. 1, 1966
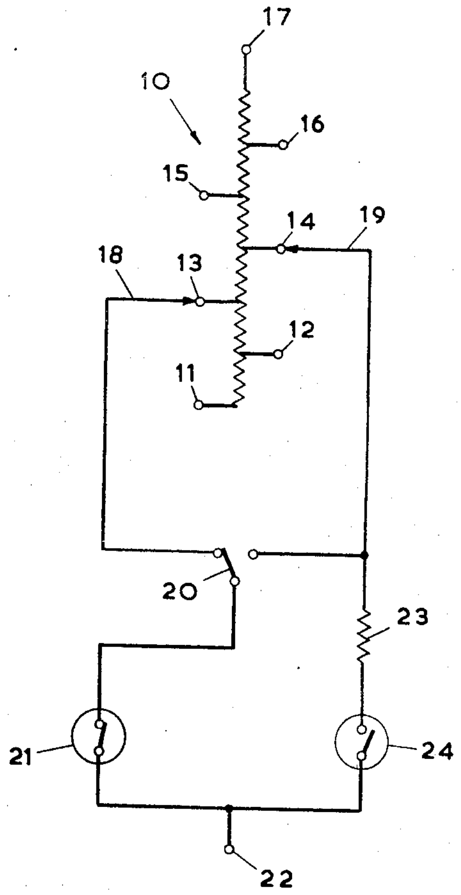
APPLICANT
Vernon Rowley Hyde
BY
Misegades & Douglas
ATTORNEYS United States Patent Office 3,493,847

Patented Feb. 3, 1970

3,493,847

ON-LOAD TAP CHANGING CIRCUITS

Vernon Rowley Hyde, Stafford, England, assignor to The English Electric Company Limited, London, England, a British company Filed Dec. 1, 1966, Ser. No. 598,401
Claims priority, application Great Britain, Dec. 1, 1965, 51,100/65
Int. Cl. H02p *13/06*
U.S. Cl. 323—43.5 3 Claims

ABSTRACT OF THE DISCLOSURE

An on-load tap changing circuit for an inductive winding with tappings comprises two selector switches arranged for alternately making connection to successive tappings, and a changeover switch which is operable to connect either one or the other of the selector switches to a common connection point so that a load current carrying connection may be established between the common connection point and any desired tapping of the winding. A vacuum switch in series with the changeover switch enables the changeover switch to be operated off-load.

A director circuit is connectable by a further vacuum switch between the common connection point and one of the selector switches to provide a temporary path for load current flow between the common connection point and the winding when the changeover switch is being operated.

This invention relates to on-load tap changing circuits for inductive windings with tappings.

One object of the present invention is to provide an improved on-load tap changing circuit.

A further object of the present invention is to provide an on-load tap changing circuit which requires only two current interruptors.

A further object of the present invention is to provide an on-load circuit having low space and maintenance requirements.

In accordance with the present invention there is provided an on-load tap changing circuit comprising, in combination, two selector means for alternately making connection to successive tappings, a common connection point, a switching means for establishing a load current carrying connection between a said tapping and the common connection point by connecting the common connection point to a first of the tapping selector means when making connection to the said tapping, and for subsequently transferring the load current carrying connection from the said tapping to a successive tapping by reconnecting the common connection point to the second of the tapping selector means when connected to the said successive tapping, and a diverter circuit including an impedance connectable between the common connection point and a said tapping selector means for providing a temporary path for load current flow between the winding and the common connection point while such transference is taking place.

Advantageously, the switching means may comprise a current interruptor means and an off-load changeover switching means in series with said current interruptor means, said current interruptor means being arranged to open before, and to close after, operation of the changeover switching means.

In order to keep space and maintenance requirements to a low level, the current interruptor means may comprise a vacuum interruptor. Preferably a further vacuum interruptor is included in the divertor circuit.

In order that the invention may be more clearly understood, an on-load tap changing circuit for an electrical transformer and embodying the invention will now be described, by way of example, with reference to the accompanying drawing which diagrammatically shows the tap changing circuit.

In the drawing there is shown a transformer winding 10 having six tapping points consecutively numbered 11 to 16 as shown and having at one end thereof a high voltage terminal 17.

The moving contact 18 of an off-load selector switch is movable by means (not shown) to co-operate with a desired tapping point 11, 13 or 15. In a similar way the tapping points 12, 14 and 16 are associated with the moving contact 19 of a further off-load selector switch.

The moving contacts 18 and 19 are alternately connectable by a changeover switch 20 through a main switch 21 to a neutral point 22 which may be earthed if desired.

Between the moving contact 19 and the neutral point 22 is connected a divertor circuit comprising a resistance 23 and a divertor switch 24.

Operation of the tap changing circuit to vary the voltage between the terminal 17 and the neutral point 22 is as follows.

Considering the winding 10 to be connected to the neutral point 22 at tapping point 13 as shown and that a tapchange is required to tapping point 14. Tapchanging is initiated when the diverter switch 24 is closed, and the sequence continues with the opening of the main switch 21. Current flowing between the terminal 17 and the neutral point 22 is thereby transferred from the direct connection comprising the main switch 21 and the tapping point 13 to the connection comprising the resistor 23, the divertor switch 24 and the tapping point 14.

The changeover switch 20 is then operated and the main switch 21 subsequently closed so that the required direct connection between the tapping point 14 and the neutral point 22 is made.

The tapchanging operation is completed by the opening of the divertor switch 24.

If a further tapchange in the upward direction is still required, the moving contact 18 is moved to engage the tapping point 15 and the sequence is repeated.

If, however, it is required to reconnect the neutral point 22 to the tapping point 13 the sequence is repeated but the contact 18 is not moved.

It will be appreciated that tap changing as described above is similarly and correspondingly effected to change the connection on the winding 10 from any tapping point on the winding to any adjacent tapping thereon.

The resistor 23 is provided to limit the circulating current which flows around the closed loop formed when the main and divertor switches 21 and 24 are both closed with the changeover switch at the position shown.

Neither the selector switches (having the moving contacts 18 and 19) nor the changeover switch 20 are required either to make or break current. They may, therefore, be relatively simple off-load devices disposed, if desired, within the transformer tank itself.

The switches 21 and 24 may each be of any suitable kind such, for example, as an air break switch. However, as only a small number of switches are required, the tap changing circuit described is particularly suited for the use of vacuum switches for the switches 21 and 24. Maintenance and space requirements of these switches are thereby kept at a low level. If desired the two switches, when vacuum switches, may be disposed in the transformer tank together with the selector switches and the changeover switch.

The impedance in the divertor circuit may be provided by a resistor as shown or alternatively or additionally it may be provided by an inductor.

Although the described embodiment has the two tapping selector means for selecting the tappings on the winding each constituted by a switch having a movable contact, in another possible arrangement one switch is separately provided for each tapping, the switches being operated in the desired sequence.

The tap changing circuit of the present invention has been specifically described in relation to a transformer winding. It will be appreciated, however, that it may be used in relation to a reactor winding.

I claim:

1. For an inductive winding with tappings, an on-load tap changing circuit comprising, in combination, two tapping selector means for alternately making connection to successive tappings, a common connection point, a switching means for establishing a load current carrying connection between the inductive winding at a said tapping and the common connection point by connecting the common connection point to a first of the tapping selector means when making connection to the said tapping, and for subsequently transferring the load current carrying connection to the inductive winding from the said tapping to a successive tapping by, in succession, disconnecting the common connection point from the said first tapping selector means and thereafter connecting the common connection point to the second of the tapping selector means when connected to the said successive tapping, and a diverter circuit including an impedance connectable between the common connection point and a said tapping selector means for providing a temporary path for load current flow between the winding and the common connection point while, during such transference, the common connection point is otherwise disconnected from the inductive winding.

2. An on-load tap changing circuit according to claim 1 wherein the switching means comprises a current interruptor means and an off-load changeover switching means in series with said current interruptor means, said current interruptor means being arranged to open before, and to close after, operation of the changeover switching means.

3. For an inductive winding having tappings, an on-load tap changing circuit comprising, in combination, two tapping selector means for alternately making connection to successive tappings, a common connection point, an off-load changeover switching means connectable between the two tapping selector means and the common connection point for providing a load current carrying connection between a said tapping and the common connection point by connecting the common connection point to a first of the tapping selector means when making connection to the said tapping, and for subsequently transferring the load current carrying connection from the said tapping to a successive tapping by re-connecting the common connection point to the second of the tapping selector means when connected to the said successive tapping, a first current interruptor means connected between the common connection point and the changeover switching means and arranged to open before, and to close after, operation of the changeover switching means, a diverter circuit including an impedance connectable between the common connection point and a said tapping selector means for providing a temporary path for load current flow between the winding and the common connection point while such transference is taking place, and a second current interrupter means included in the diverter circuit for connecting the diverter circuit to provide the said temporary path.

References Cited

UNITED STATES PATENTS 2,440,983 5/1948 Palley ____________ 323—43.5

FOREIGN PATENTS 761,983 11/1956 Great Britain.

LEE T. HIX, Primary Examiner

G. GOLDBERG, Assistant Examiner

U.S. Cl. X.R.

307—131; 323—91